(12) United States Patent
Simon

(10) Patent No.: US 8,857,213 B2
(45) Date of Patent: Oct. 14, 2014

(54) VERTICAL GLASS DISTRIBUTION HABITUATING CONTROL SYSTEM AND METHOD

(75) Inventor: Jonathan Seth Simon, Pleasant Valley, CT (US)

(73) Assignee: Emhart Glass S.A., Cham (CH)

( * ) Notice: Subject to any disclaimer, the term of this patent is extended or adjusted under 35 U.S.C. 154(b) by 173 days.

(21) Appl. No.: 13/347,194

(22) Filed: Jan. 10, 2012

(65) Prior Publication Data
US 2012/0174628 A1 Jul. 12, 2012

Related U.S. Application Data

(60) Provisional application No. 61/431,859, filed on Jan. 12, 2011.

(51) Int. Cl.
C03B 9/41 (2006.01)

(52) U.S. Cl.
CPC .............................. *C03B 9/41* (2013.01)
USPC ................ 65/29.1; 65/29.12; 65/161

(58) Field of Classification Search
CPC ...... C03B 9/3627; C03B 9/3663; C03B 9/41; C03B 9/3816
USPC ............. 65/160–164, 227–252; 700/157–158
See application file for complete search history.

(56) References Cited

U.S. PATENT DOCUMENTS

| | | | | | |
|---|---|---|---|---|---|
| 1,843,160 | A | * | 2/1932 | Ingle | 65/75 |
| 2,273,777 | A | * | 2/1942 | Berthold | 65/76 |
| 2,915,638 | A | * | 12/1959 | Poole | 65/158 |
| 3,762,907 | A | * | 10/1973 | Quinn et al. | 65/164 |
| 3,905,793 | A | * | 9/1975 | Croughwell | 65/163 |
| 4,108,623 | A | * | 8/1978 | Cardenas-Franco | 65/163 |
| 4,255,179 | A | * | 3/1981 | Foster | 65/79 |
| 4,457,772 | A | * | 7/1984 | Haynes et al. | 65/160 |
| 4,478,629 | A | * | 10/1984 | Wood et al. | 65/163 |
| 4,507,136 | A | * | 3/1985 | Northup | 65/79 |
| 5,931,982 | A | * | 8/1999 | Gottlieb | 65/208 |
| 6,009,727 | A | * | 1/2000 | Grant et al. | 65/359 |
| 6,401,491 | B1 | * | 6/2002 | Wacke | 65/301 |
| 6,604,384 | B2 | * | 8/2003 | Simon | 65/159 |
| 6,604,385 | B2 | * | 8/2003 | Simon | 65/163 |
| 6,604,386 | B2 | * | 8/2003 | Simon | 65/163 |
| 6,606,886 | B2 | * | 8/2003 | Simon | 65/163 |
| 6,705,119 | B2 | * | 3/2004 | Simon | 65/163 |
| 6,705,120 | B2 | * | 3/2004 | Simon | 65/163 |
| 6,711,916 | B2 | * | 3/2004 | Simon | 65/29.11 |
| 6,722,158 | B2 | * | 4/2004 | Simon | 65/29.11 |
| 2003/0101753 | A1 | * | 6/2003 | Fenton et al. | 65/161 |
| 2006/0090513 | A1 | * | 5/2006 | Simon | 65/158 |
| 2011/0141264 | A1 | * | 6/2011 | Holtkamp et al. | 348/86 |
| 2011/0141265 | A1 | * | 6/2011 | Holtkamp et al. | 348/86 |

FOREIGN PATENT DOCUMENTS

JP 2003-212566 7/2003

OTHER PUBLICATIONS

PCT Search Report from PCT/US2012/020880 issued Aug. 7, 2012.

\* cited by examiner

*Primary Examiner* — Jodi C Franklin

(74) *Attorney, Agent, or Firm* — Reinhart Boerner Van Deuren s.c.

(57) ABSTRACT

A system and method for automatically adjusting I.S. machine timing to maintain desired vertical glass distribution to improve process yield and quality while reducing dependence on operator skill. Deficiencies in the vertical glass distribution are rapidly addressed by automatically varying the start of final blow to allow more or less stretching of the parison, and more fundamentally addressed by adjusting the cooling of the parison mold. The cooling time of the parison mold may be adjusted by using final blow timing error correction or by also using parison mold temperature error correction.

19 Claims, 2 Drawing Sheets

VERTICAL GLASS DISTRIBUTION HABITUATING CONTROL SYSTEM AND METHOD

IDENTIFICATION OF RELATED PATENT APPLICATIONS

This patent application claims priority of U.S. Provisional Patent Application No. 61/431,859, which is entitled "Vertical Glass Distribution Habituating Control System and Method," and which was filed on Jan. 12, 2011, which patent application is hereby incorporated herein by reference in its entirety.

BACKGROUND OF THE INVENTION

Field of the Invention

The present invention relates generally to operation of an I.S. machine and more particularly to improving process yield and quality while reducing dependence on operator skill by automatically adjusting I.S. machine timing to maintain desired vertical glass distribution.

A system and method for monitoring hot glass containers at the hot end as they stream from an I.S. machine manufacturing them is disclosed in European Patent Application No. EP 09075545.5, filed on Dec. 10, 2009, entitled "Method and System for Monitoring and Controlling a Glass Container Forming Process," in U.S. patent application Ser. No. 12/963,370, filed on Dec. 8, 2010, entitled "Method and System for Monitoring and Controlling a Glass Container Forming Process," and in U.S. patent application Ser. No. 12/963,405, filed on Dec. 8, 2010, entitled "System and Method for Monitoring Hot Glass Containers to Enhance Their Quality and Control the Forming Process," all three of which are assigned to the assignee of the present patent application, and all three of which are hereby incorporated herein by reference in their entirety.

While these systems and methods enable the quality of hot glass containers manufactured by an I.S. machine to be monitored, it would be beneficial to use the large amount of information available on the characteristics of the hot glass containers provided by these systems and methods to further enhance the quality of the hot glass containers being manufactured by the I.S. machine. In this regard, it would be beneficial to use some of the information regarding the characteristics of the hot glass containers provided by these systems and methods to automatically control the operation of the I.S. machine to further enhance the quality of the hot glass containers being produced.

In general, automatic adjustment of the machine to maintain glass distribution based upon the information available on the characteristics of the hot glass containers has not been accomplished in the past, and would thus represent a new development. Fundamentally, the best glass distribution will be achieved when the operating conditions of the I.S. machine are closest to the conditions for which the parison/blank molds have been designed. If conditions change, the glass distribution may also be impacted.

SUMMARY OF THE INVENTION

The disadvantages and limitations of the background art discussed above are overcome by the present invention. With this invention, in a first embodiment the problem of poor vertical glass distribution is determined by a glass distribution measurement system (such as the one described in European Patent Application No. EP 09075545.5, U.S. patent application Ser. No. 12/963,370, and U.S. patent application Ser. No. 12/963,405, all of which were incorporated by reference herein in their entirety) and then treated by changing the timing of the start of final blow of the parison, thus modifying the time allowed for the parison to stretch or "run."

A vertical glass distribution with too much glass in the lower portion of the hot glass container may be treated by advancing the start of final blow, allowing less time for the parison to stretch prior to the parison being blown. A vertical glass distribution with too little glass in the lower portion of the hot glass container may be treated by delaying the start of final blow, thereby allowing more time for the parison to stretch prior to the parison being blown. Since the glass distribution measurement system used to provide an input to the vertical glass distribution habituating control system of the present invention is located at the "hot end" of the glass container manufacturing line, it will be appreciated that this is a relatively rapid control process.

In a preferred implementation of this first embodiment, a better result in terms of improved vertical glass distribution may be achieved by addressing the underlying cause of the vertical glass distribution deficiency. A prevalent cause is a problem in the thermal balance on the blank side which causes a hotter or colder parison, which causes faster or slower, respectively, stretching of the parison in the blow mold. The vertical glass distribution habituating control system of the present invention preferably uses a multilayered approach, in which the quick response provided by adjusting the timing of the final blow as described above, which may be seen as partial relief of the symptom, is supplemented by a longer term adjustment to the blank side heat balance, which addresses the underlying cause of the vertical glass distribution problem.

In the preferred implementation of the first embodiment, the time that the cooling air is applied to the parison mold is varied to remove more or less heat from the parison mold. This modification of the parison heat removal process will affect the stretch process of the parison in the blow mold, and thus will have a direct affect on the vertical glass distribution of the blown parison.

In a second embodiment, the temperature of the parison mold is monitored and used to further affect the cooling of a parison in the parison mold. A parison mold temperature setpoint is used, with deviations in the measured parison mold temperature being used to control the cooling time of the parison mold.

DESCRIPTION OF THE DRAWINGS

These and other advantages of the present invention are best understood with reference to the drawings, in which.

DETAILED DESCRIPTION OF THE EXEMPLARY EMBODIMENT

Figure 1:
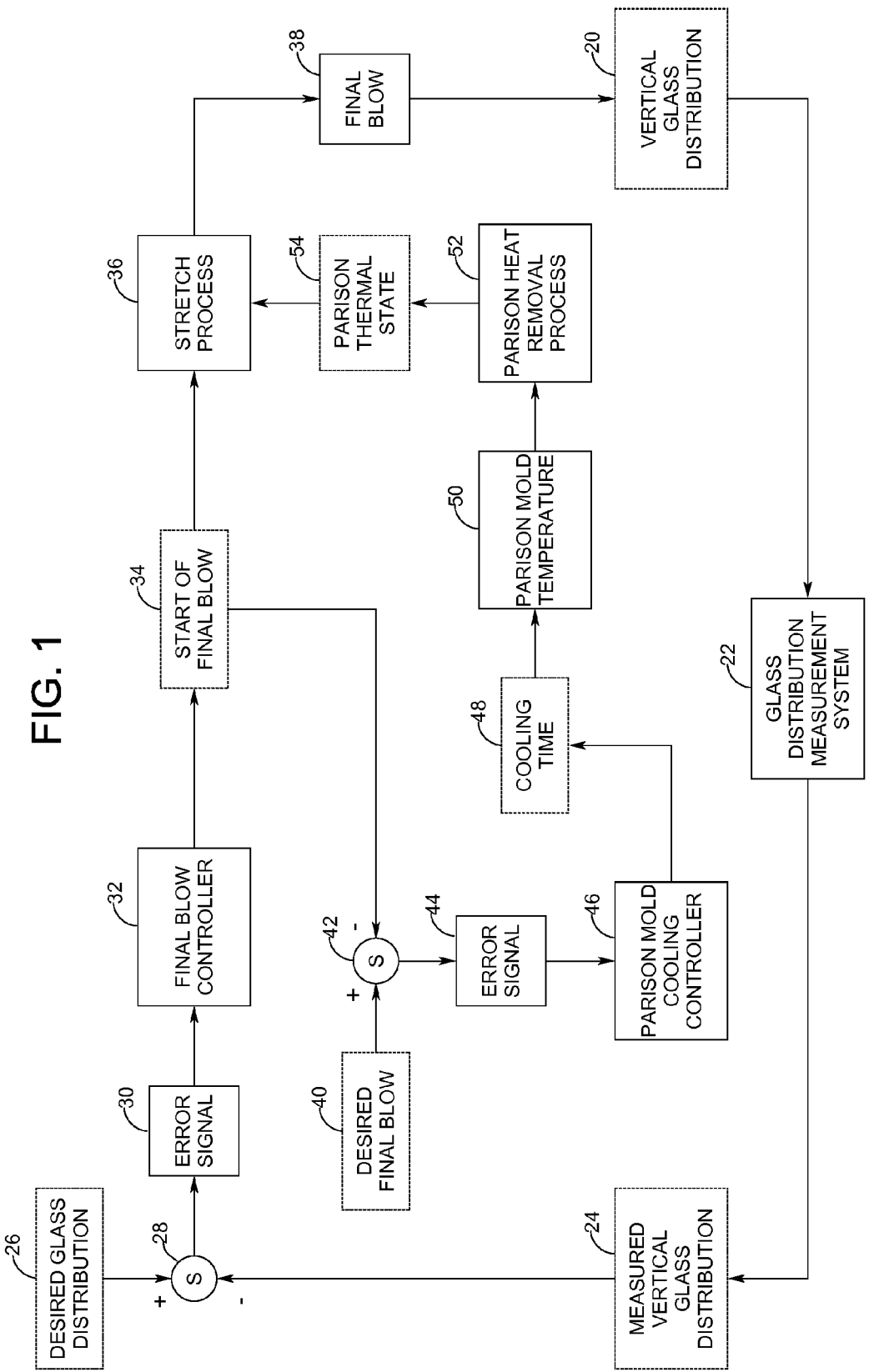
FIG. 1 is a functional schematic depiction of the vertical glass distribution habituating control system of the present invention.

A first preferred embodiment of the vertical glass distribution habituating control system of the present invention is illustrated in FIG. 1, and includes two feedback control loops, one of which provides a fast response and the other of which provides a slower response. The vertical glass distribution 20 of hot glass containers manufactured by an I.S. machine is determined by a glass distribution measurement system 22, which provides as an output a measured glass distribution signal 24. The glass distribution measurement system 22 provides a signal that may be either temperature or thickness. Some data processing may be necessary to better distinguish cold bottoms from thin bottoms. The glass distribution measurement system 22 is described in European Patent Application No. EP 09075545.5, U.S. patent application Ser. No. 12/963,370, and U.S. patent application Ser. No. 12/963,405, all of which were incorporated by reference herein in their entirety.

The measured glass distribution signal 24 is compared with a desired glass distribution signal 26 in a summer 28 to produce as feedback a vertical glass distribution error signal 30 that is provided to a final blow controller 32. In response to a non-zero vertical glass distribution error signal 30, the final blow controller 32 modifies the timing of the start of final blow 34 that is established to attempt to drive the non-zero vertical glass distribution error signal 30 to zero by adjusting the start of final blow. A change in the timing of the start of final blow 34 will affect the physical stretch process 36 of the parison in the blow mold, which will have a direct effect on the vertical glass distribution 20 of the blown parison following a final blow operation 38. In a variation, an adjustment to the start of vacuum applied to the blow mold may be used instead of, or in addition to the start of final blow 34.

If the vertical glass distribution has too much glass in the lower portion of the hot glass container and too little glass in the upper portion of the hot glass container as determined by the glass distribution measurement system 22, the start of final blow 34 will be advanced, thereby allowing less time for the parison to stretch in the stretch process 36 in the blow mold prior to the parison being blown. If, on the other hand, the vertical glass distribution has too little glass in the lower portion of the hot glass container and too much glass in the upper portion of the hot glass container as determined by the glass distribution measurement system 22, the start of final blow 34 will be further delayed, thereby allowing more time for the parison to stretch in the stretch process 36 in the blow mold prior to the parison being blown.

The vertical glass distribution habituating control system of the present invention as described to this point constitutes the first feedback control loop, and this feedback loop will provide a relatively rapid response. A second feedback control loop may also be provided as shown in FIG. 1. The second feedback control loop is used to control the thermal state of the parison as it leaves the parison mold.

In the second feedback control loop, the actual start of final blow 34 calculated by the final blow controller 32 is subtracted from a desired start of final blow 40 in a summer 42 to produce as feedback a final blow error signal 44 that is provided to a parison mold cooling controller 46. In response to a final blow error signal 44, the parison mold cooling controller 46 modifies the cooling time of the parison mold 48 that is established to attempt to drive the final blow error signal 44 to zero to thereby adjust the cooling of the parison. A change in the cooling time of the parison mold 48 will affect the parison mold temperature 50, which will modify the parison heat removal process 52. This change in the parison heat removal process 52 will affect the parison thermal state 54 and thus influence the stretch process 36, which as stated above will have a direct affect on the vertical glass distribution 20 of the blown parison following the final blow operation 38.

This completes the second feedback control loop, and this feedback control loop will provide a relatively slower response. The first and second feedback loops are related, inasmuch as a change in the stretch process 36 caused by the second feedback control loop as a result of adjusting the cooling of the parison mold will cause a change in the measured glass distribution signal 24, which will operate to cause the final blow controller 32 to change the start of final blow 34. Over time, the two feedback control loops will operate to return the process to its nominal operating conditions, with the first feedback control loop providing a faster response to vertical glass distribution errors determined by the glass distribution measurement system 22, and with the second feedback control loop providing a slower response but one which ultimately will return the process to its nominal operating conditions.

A second preferred embodiment of the vertical glass distribution habituating control system of the present invention is illustrated in FIG. 3, and includes a third feedback control loop that is installed in the second feedback control loop. In this third feedback control loop, an additional measurement is made of the blank temperatures using a parison mold temperature measurement system 60. The parison mold temperature measurement system 60 determines a measured parison mold temperature 62 and provides it as an output.

The parison mold cooling controller 46 computes a parison mold temperature setpoint 64 instead of providing the cooling time of the parison mold 48 as in the system of FIG. 1. The measured parison mold temperature 62 provided by the parison mold temperature measurement system 60 is subtracted from the parison mold temperature setpoint 64 in a summer 66 to produce as feedback a parison mold temperature error signal 68 that is provided to a parison mold temperature controller 70. In response to the parison mold temperature error signal 68, the parison mold temperature controller 70 modifies the cooling time of the parison mold 72 that is established to attempt to drive the parison mold temperature error signal 68 to zero by adjusting the cooling of the parison mold 72. A change in the cooling time of the parison mold 72 will affect the parison mold temperature 50 and thus the measured parison mold temperature 62 determined by the parison mold temperature measurement system 60.

This completes the third feedback control loop, which feedback control loop will attempt to drive the parison mold temperature error signal 68 to zero. It will be appreciated that all three feedback loops are related.

As an alternative, the third feedback control loop could also be used to control the temperature change in the molds before and after the parison is formed. The degree of cooling imparted by the parison mold to the parison may also be varied by varying the parison contact time in the parison mold after the parison is blown. Another approach would be to measure the temperature of the parison and use it instead of using the temperature of the parison mold.

Figure 2:
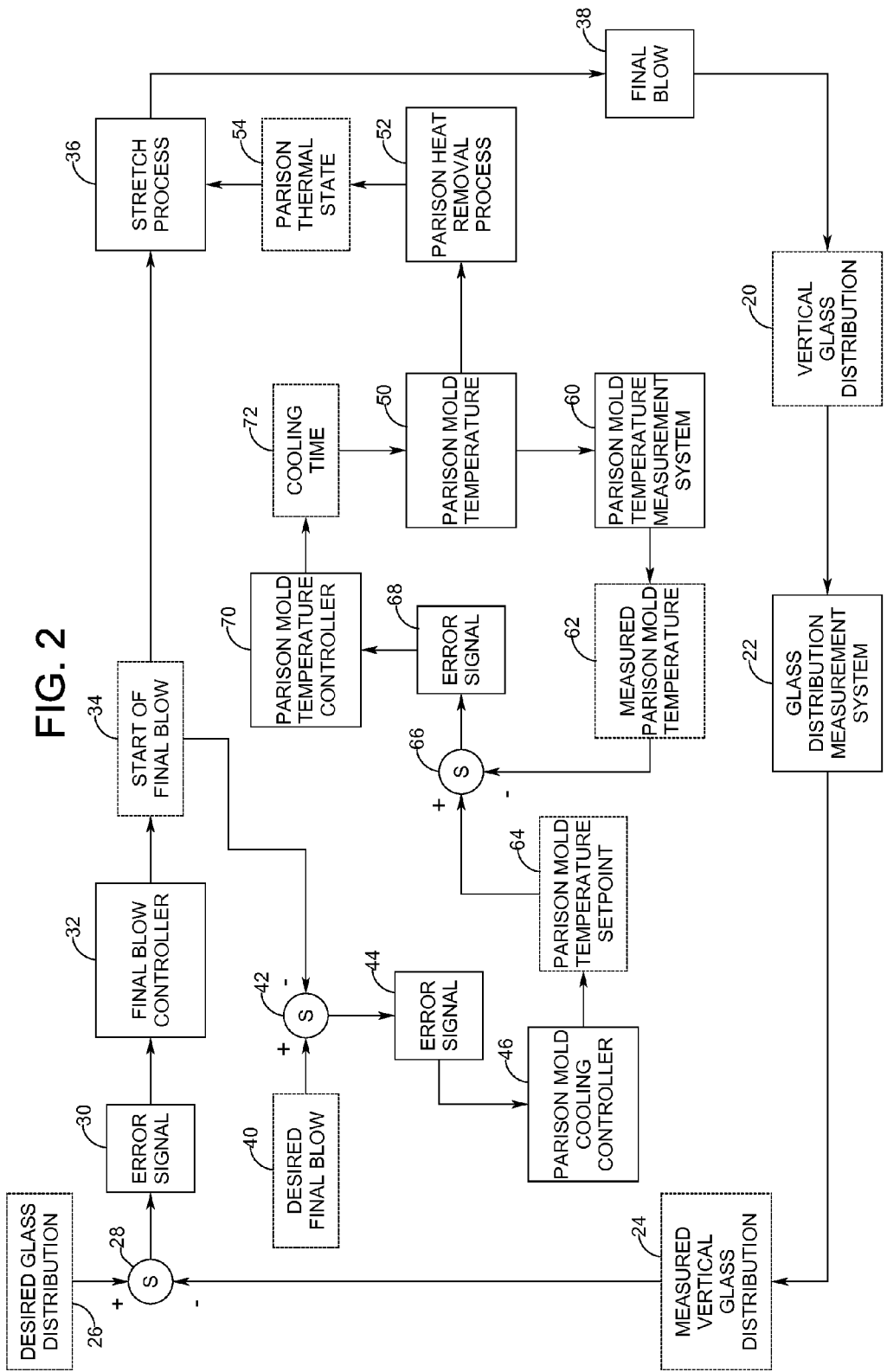
FIG. 2 is a functional schematic depiction of the vertical glass distribution habituating control system of the present invention with the addition of blank temperature feedback.

In either the configuration of FIG. 1 or the configuration of FIG. 2, the vertical glass distribution habituating control system of the present invention could use an infrared camera system in which the vertical glass distribution is correlated with the measured intensity. The vertical glass distribution habituating control system could also be extended or modified to include the timing of the vacuum in addition to or as a substitute for the final blow. It would also be possible to use any of the feedback control loops described herein singly, or any pair together, or all three together as described in this second embodiment.

Although the foregoing description of the vertical glass distribution habituating control system of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A system for correcting deficiencies in vertical glass distribution, comprising:
   a glass distribution measurement system configured to generate a measured glass distribution indicative of actual vertical glass distribution in blown parisons;
   the system configured to be provided with a desired vertical glass distribution;
   a summer configured to compare the measured glass distribution with the desired vertical glass distribution and to generate a vertical glass distribution error signal indicative of the result of the comparison of the measured glass distribution with the desired vertical glass distribution;
   a final blow controller configured to use the vertical glass distribution error signal to generate a start of final blow signal configured to modify the timing of the start of final blow to vary the stretching of a parison in a blow mold prior to the parison being blown in a manner that will cause the vertical glass distribution error signal to be diminished; and
   a parison mold cooling controller that is arranged and configured to selectively vary the cooling time of a parison mold.

2. A system as defined in claim 1, wherein the glass distribution measurement system is configured to determine the vertical glass distribution in blown parisons after the parisons have been blown; and
   wherein the system is arranged and configured to selectively apply a vacuum to the blow mold which vacuum will affect the stretching of a parison in a blow mold prior to the parison being blown, and wherein the final blow controller is arranged and configured to modify the timing of the start of vacuum applied to the blow mold instead of, or in addition to, modifying the timing of the start of final blow.

3. A system as defined in claim 1, wherein the final blow controller is arranged and configured to advance the start of final blow if the vertical glass distribution error signal is indicative of the vertical glass distribution having more than a first predetermined amount of glass in a lower portion of the hot glass container and less than a second predetermined amount of glass in an upper portion of the hot glass container, and wherein the final blow controller is arranged and configured to retard the start of final blow if the vertical glass distribution error signal is indicative of the vertical glass distribution having less than a third predetermined amount of glass in a lower portion of the hot glass container and more than a fourth predetermined amount of glass in an upper portion of the hot glass container.

4. A system as defined in claim 1, wherein the system is configured to receive a desired start of final blow signal, the system additionally comprising:
   a summer for comparing the start of final blow signal with the desired start of final blow signal and generating a final blow error signal;
   wherein the parison mold cooling controller is arranged and configured to use the final blow error signal to modify the cooling time of the parison mold in a manner that will cause the final blow error signal to be diminished.

5. A system as defined in claim 4, wherein the parison mold cooling controller is arranged and configured to increase the cooling time of the parison mold if the final blow error signal is indicative of the start of final blow occurring later than desired, and wherein the parison mold cooling controller is arranged and configured to decrease the cooling time of the parison mold if the final blow error signal is indicative of the start of final blow occurring earlier than desired.

6. A system as defined in claim 4, wherein the final blow controller is arranged and configured in a first feedback loop and the parison mold cooling controller is arranged and configured in a second feedback loop, wherein the second feedback loop is arranged and configured to provide a relatively slower response than the first feedback loop.

7. A system for correcting deficiencies in vertical glass distribution, comprising:
   a glass distribution measurement system configured to generate a measured glass distribution indicative of actual vertical glass distribution in blown parisons;
   the system configured to be provided with a desired vertical glass distribution;
   a summer configured to compare the measured glass distribution with the desired vertical glass distribution and to generate a vertical glass distribution error signal indicative of the result of the comparison of the measured glass distribution with the desired vertical glass distribution;
   a final blow controller configured to use the vertical glass distribution error signal to generate a start of final blow signal configured to modify the timing of the start of final blow to vary the stretching of a parison in a blow mold prior to the parison being blown in a manner that will cause the vertical glass distribution error signal to be diminished;
   a parison mold cooling controller that is arranged and configured to provide a parison mold temperature setpoint for a parison mold; and
   a parison mold temperature controller that is arranged and configured to modify the temperature of a parison.

8. A system as defined in claim 7, wherein the parison mold cooling controller provides a parison mold temperature setpoint signal, wherein the system is configured to receive a desired start of final blow signal, and wherein the system additionally comprises:
   a summer for comparing the start of final blow signal with the desired start of final blow signal and generating a final blow error signal;
   wherein the parison mold cooling controller is arranged and configured to use the final blow error signal to modify the parison mold temperature setpoint signal in a manner that will cause the final blow error signal to be diminished;
   a parison mold temperature measurement system that provides a measured parison mold temperature signal; and
   a summer for comparing the measured parison mold temperature signal with the parison mold temperature setpoint signal and generating a parison mold temperature error signal;

wherein the parison mold temperature controller is arranged and configured to use the parison mold temperature error signal to modify the cooling time of the parison mold in a manner that will cause the parison mold temperature error signal to be diminished.

9. A system as defined in claim 7, wherein the parison mold cooling controller provides a parison mold temperature change setpoint signal, wherein the system is configured to receive a desired start of final blow signal, and wherein the system additionally comprises:
   a summer for comparing the start of final blow signal with the desired start of final blow signal and generating a final blow error signal;
wherein the parison mold cooling controller is arranged and configured to use the final blow error signal to modify the parison mold temperature setpoint signal in a manner that will cause the final blow error signal to be diminished;
   a parison mold temperature change measurement system that provides a measured of the temperature change in the parison mold before and after a parison is formed; and
   a summer for comparing the measured parison mold temperature change signal with the parison mold temperature change setpoint signal and generating a parison mold temperature change error signal;
wherein the parison mold temperature controller is arranged and configured to use the parison mold temperature change error signal to modify the cooling time of the parison mold in a manner that will cause the parison mold temperature error signal to be diminished.

10. A system as defined in claim 7, wherein the glass distribution measurement system is configured to determine the vertical glass distribution in blown parisons after the parisons have been blown; and
   wherein the system is arranged and configured to selectively apply a vacuum to the blow mold which vacuum will affect the stretching of a parison in a blow mold prior to the parison being blown, and wherein the final blow controller is arranged and configured to modify the timing of the start of vacuum applied to the blow mold instead of, or in addition to, modifying the timing of the start of final blow.

11. A system as defined in claim 7, wherein the final blow controller is arranged and configured to advance the start of final blow if the vertical glass distribution error signal is indicative of the vertical glass distribution having more than a first predetermined amount of glass in a lower portion of the hot glass container and less than a second predetermined amount of glass in an upper portion of the hot glass container, and wherein the final blow controller is arranged and configured to retard the start of final blow if the vertical glass distribution error signal is indicative of the vertical glass distribution having less than a third predetermined amount of glass in a lower portion of the hot glass container and more than a fourth predetermined amount of glass in an upper portion of the hot glass container.

12. A system for correcting deficiencies in vertical glass distribution, comprising:
   a glass distribution measurement system configured to generate a measured glass distribution indicative of actual vertical glass distribution in blown parisons;
   the system configured to be provided with a desired vertical glass distribution;
   a summer configured to compare the measured glass distribution with the desired vertical glass distribution and to generate a vertical glass distribution error signal indicative of the result of the comparison of the measured glass distribution with the desired vertical glass distribution;
   a final blow controller configured to use the vertical glass distribution error signal to generate a start of final blow signal configured to modify the timing of the start of final blow to vary the stretching of a parison in a blow mold prior to the parison being blown in a manner that will cause the vertical glass distribution error signal to be diminished;
   a parison mold cooling controller that is arranged and configured to provide a parison temperature setpoint; and
   a parison mold contact time controller that is arranged and configured to modify the contact time of a parison in the parison mold after is it formed in the parison mold.

13. A system as defined in claim 12, wherein the parison mold cooling controller provides a parison temperature setpoint signal, wherein the system is configured to receive a desired start of final blow signal, and wherein the system additionally comprises:
   a summer for comparing the start of final blow signal with the desired start of final blow signal and generating a final blow error signal;
wherein the parison mold cooling controller is arranged and configured to use the final blow error signal to modify the parison temperature setpoint signal in a manner that will cause the final blow error signal to be diminished;
   a parison temperature measurement system that provides a measure of the temperature of a parison after it is formed; and
   a summer for comparing the measured parison temperature of the parison with the parison temperature setpoint signal and generating a parison temperature error signal;
   wherein the parison mold temperature controller is arranged and configured to use the parison temperature error signal to modify the contact time of a parison in the parison mold after is it formed in the parison mold in a manner that will cause the parison temperature error signal to be diminished.

14. A system for correcting deficiencies in vertical glass distribution, comprising:
   a glass distribution measurement system configured to generate a measured glass distribution indicative of actual vertical glass distribution in blown parisons;
   the system configured to be provided with a desired vertical glass distribution;
   a summer configured to compare the measured glass distribution with the desired vertical glass distribution and to generate a vertical glass distribution error signal indicative of the result of the comparison of the measured glass distribution with the desired vertical glass distribution;
   a final blow controller configured to use the vertical glass distribution error signal to generate a start of final blow signal configured to modify the timing of the start of final blow to vary the stretching of a parison in a blow mold prior to the parison being blown in a manner that will cause the vertical glass distribution error signal to be diminished;
   a parison mold cooling controller that is arranged and configured to provide a parison temperature setpoint; and
   a parison temperature controller that is arranged and configured to modify the temperature of a parison formed in the parison mold.

15. A system as defined in claim 14, wherein the parison mold cooling controller provides a parison temperature setpoint signal, wherein the system is configured to receive a desired start of final blow signal, and wherein the system additionally comprises:
 a summer for comparing the start of final blow signal with the desired start of final blow signal and generating a final blow error signal;
wherein the parison mold cooling controller is arranged and configured to use the final blow error signal to modify the parison temperature setpoint signal in a manner that will cause the final blow error signal to be diminished;
 a parison temperature measurement system that provides a measure of the temperature of a parison after it is formed in the parison mold; and
 a summer for comparing the measured parison temperature with the parison temperature setpoint signal and generating a parison temperature error signal;
 wherein the parison temperature controller is arranged and configured to use the parison temperature signal to modify the cooling time of the parison mold in a manner that will cause the parison temperature error signal to be diminished.

16. A system as defined in claim 14, wherein the glass distribution measurement system is configured to determine the vertical glass distribution in blown parisons after the parisons have been blown; and
wherein the system is arranged and configured to selectively apply a vacuum to the blow mold which vacuum will affect the stretching of a parison in a blow mold prior to the parison being blown, and wherein the final blow controller is arranged and configured to modify the timing of the start of vacuum applied to the blow mold instead of, or in addition to, modifying the timing of the start of final blow.

17. A system as defined in claim 14, wherein the final blow controller is arranged and configured to advance the start of final blow if the vertical glass distribution error signal is indicative of the vertical glass distribution having more than a first predetermined amount of glass in a lower portion of the hot glass container and less than a second predetermined amount of glass in an upper portion of the hot glass container, and wherein the final blow controller is arranged and configured to retard the start of final blow if the vertical glass distribution error signal is indicative of the vertical glass distribution having less than a third predetermined amount of glass in a lower portion of the hot glass container and more than a fourth predetermined amount of glass in an upper portion of the hot glass container.

18. A system as defined in claim 12, wherein the glass distribution measurement system is configured to determine the vertical glass distribution in blown parisons after the parisons have been blown; and
 wherein the system is arranged and configured to selectively apply a vacuum to the blow mold which vacuum will affect the stretching of a parison in a blow mold prior to the parison being blown, and wherein the final blow controller is arranged and configured to modify the timing of the start of vacuum applied to the blow mold instead of, or in addition to, modifying the timing of the start of final blow.

19. A system as defined in claim 12, wherein the final blow controller is arranged and configured to advance the start of final blow if the vertical glass distribution error signal is indicative of the vertical glass distribution having more than a first predetermined amount of glass in a lower portion of the hot glass container and less than a second predetermined amount of glass in an upper portion of the hot glass container, and wherein the final blow controller is arranged and configured to retard the start of final blow if the vertical glass distribution error signal is indicative of the vertical glass distribution having less than a third predetermined amount of glass in a lower portion of the hot glass container and more than a fourth predetermined amount of glass in an upper portion of the hot glass container.

\* \* \* \* \*